Jan. 30, 1940.　　　　　　P. J. JENNINGS　　　　　2,188,753
FISH LURE AND METHOD OF DETERMINING THE PROPER COLORING THEREOF
Filed July 8, 1939　　　2 Sheets-Sheet 1
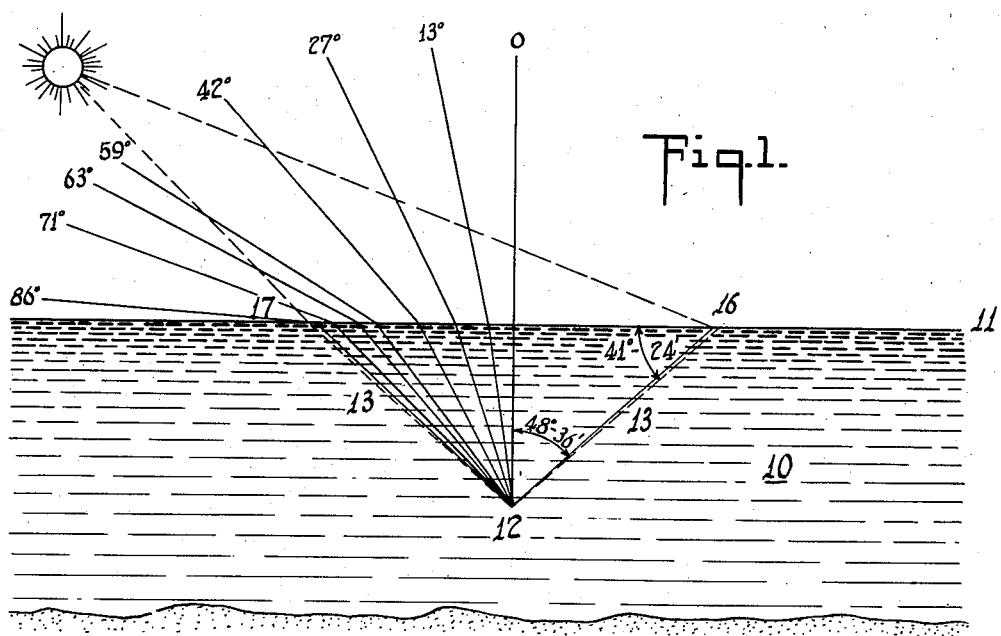
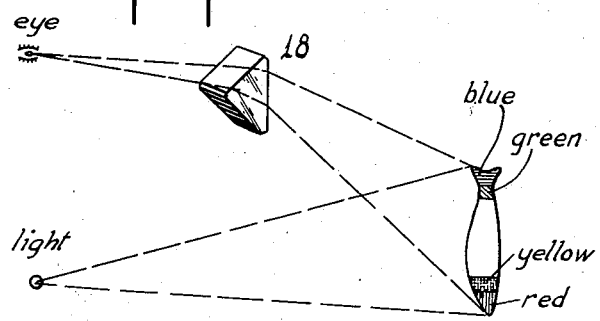
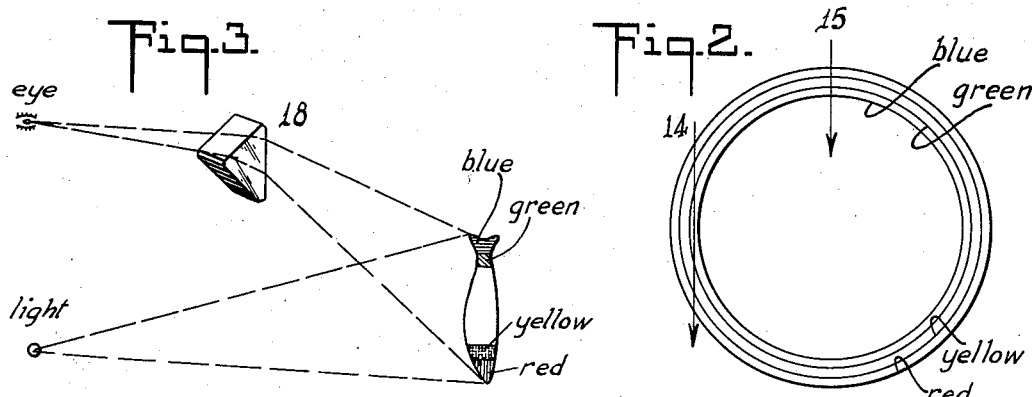
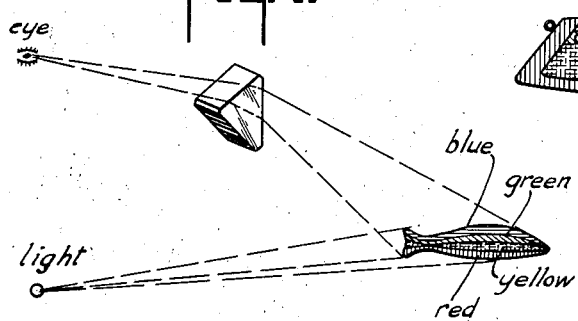
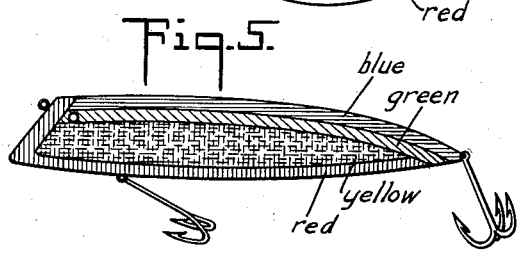
INVENTOR
Preston J. Jennings
BY
his ATTORNEY

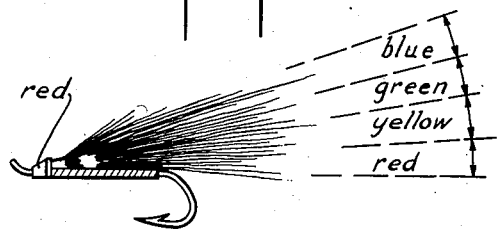
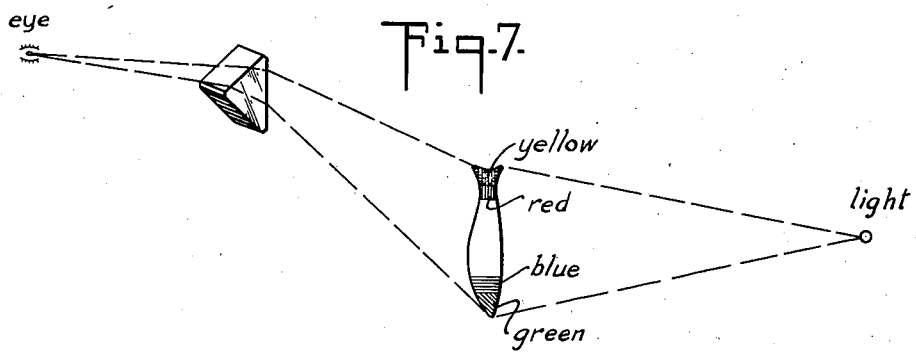
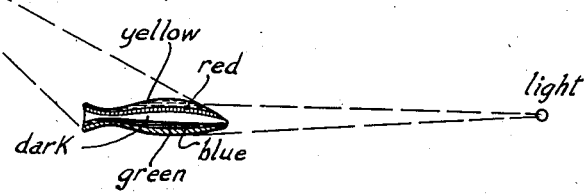
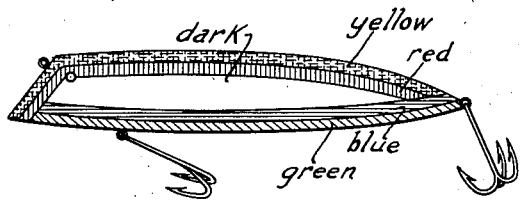

Patented Jan. 30, 1940

2,188,753

UNITED STATES PATENT OFFICE 2,188,753

FISH LURE AND METHOD OF DETERMINING THE PROPER COLORING THEREOF

Preston J. Jennings, Brooklyn, N. Y.

Application July 8, 1939, Serial No. 283,365

3 Claims. (Cl. 43—42)

My invention relates to fish lures, and more particularly to the proper coloring of lures, and to a method of determining such coloring so that the lure, when seen in any location in the water by the fish, closely simulates the appearance of a natural object upon which the fish feeds when illuminated by the spectrum resulting from the passage of light through water.

Light passing obliquely from air to water is bent or refracted. The extent of the refraction is determined by the angle at which the light strikes the water, the limit being an angle of 86° from perpendicular, in which case the light entering the water would be broken to an angle of 48° 36′. Consequently a fish below the surface of the water when looking toward the surface is able to see objects on the surface only within a limited circular area, hereinafter termed the "window." This window is the base of a cone of 97° 12′ and the eye of the fish is always at the apex. Due to the critical bending of light at the outer edge of the window the white light is broken into its component parts and the window is bounded by colored bands arranged in accordance with the spectrum, red at the outside, yellow and green in the middle and blue at the inside. The surface of the water outside of this window acts as a mirror. When an insect on the surface or a small fish below the surface passes through the boundary of the cone which forms the window of a larger fish, the small fish is brilliantly illuminated with these colors. However, the coloring of the small fish or insect depends upon whether it is passing through the boundary of the cone in a radial or tangential direction and whether the large fish sees it with reflected light or silhouetted against the light above the water. It is one of the objects of my invention to determine the proper coloring of a lure so as to cause it to appear like a natural object under one or more of these conditions. Fish through experience, intuition, or some other power not understood, know that this is the normal and proper coloring for the food they are seeking. Consequently, if an artificial lure is colored in this manner, the fish is more apt to be deceived into believing that it is natural, than if it is colored in any other manner, no matter how brightly. A lure colored in this way, when below the surface of the water, appears at all times to the fish the same as the natural object, which it is intended to simulate, does when the latter passes into the color bands formed by the spectrum. Thus, while a small fish is brightly illuminated by the spectrum only for a short period of time, my artificial lure is brightly colored at all times and hence it is more apt to be noticed by the fish.

When fishing for certain kinds of fish it is desirable not only to have the lure colored in the proper manner, but to have it in other ways closely simulate the appearance of the fly or small fish upon which the larger fish is known to feed. As will appear from the following description, my invention includes a method of determining the proper coloring for a lure which is to simulate the object on which any particular fish is feeding.

Further objects and advantages of my invention will be apparent from the following description, taken in connection with the accompanying drawings, which form a part of this specification and of which:

Fig. 1 is a cross-sectional view of a stream illustrating the window and mirror formed in the surface;

Fig. 2 shows the color bands bounding the window illustrated in Fig. 1;

Fig. 3 is a perspective view showing the coloring of an object, such as a small fish, when held in vertical position and viewed through a prism while illuminated by reflected light;

Fig. 4 is a view similar to Fig. 3 but showing the coloring when the fish is in a horizontal position;

Fig. 5 is a side view of a plug colored in accordance with my invention so as to simulate a fish as it appears under the conditions illustrated in Figs. 3 and 4;

Fig. 6 is a side view of an artificial fly similarly colored;

Fig. 7 is a view similar to Fig. 3 except that the fish is illuminated by transmitted light;

Fig. 8 is a view similar to Fig. 7, but showing the fish in a horizontal position; and Fig. 9 is a side view of a plug colored so as to simulate the fish as seen in Figs. 7 and 8.

Referring more particularly to Figs. 1 and 2 reference character 10 designates a stream of water or the like, the surface of which is designated by reference character 11. If the eye of a fish is located at the point 12 and the fish is looking toward the surface, this fish is able to see things on the surface within a circular area bounded by the dotted lines 13. These lines diverge from the eye of the fish and intersect the surface of the water at an angle 48° 36′ to a perpendicular erected at the point of incidence. Light falling on the surface of the water from above is able to penetrate the surface at any point within the critical angle. As is shown in Fig. 1, the greater the obliquity of a ray striking the surface, the greater is the angle of refraction, and the greater is the splitting of the ray into its component parts of red, yellow, green and blue. On the other hand, direct light rays striking the surface outside of the window do not reach the eye of the fish and consequently the surface outside the window appears like a mirror to the fish. As is illustrated in Fig. 2, the window is bounded by a circular spectrum with red at the outside, yellow and green in the middle, and blue at the inside.

If a fly or other insect is on the surface of the water outside of the window the fish is unable to see it, except as a dark spot on the surface of the mirror. However, when the fly floats into the circular spectrum, it is brightly illuminated by the colors thereof and consequently its natural coloring is affected by it. The same is true with respect to a small fish swimming above the large fish. If the large fish happens to be looking at the surface at the time the fly or small fish passes into the spectrum, the fish is immediately attracted thereby and rises to the surface to take the fly or small fish.

In accordance with my invention I provide a lure so colored that it appears to the fish at all times the same as does the natural fly or small fish when it passes through the spectrum bounding the window. However, the natural object is colored differently depending on whether it passes tangentially through the spectrum, as indicated by the arrow 14 in Fig. 2, or radially therethrough, as indicated by the arrow 15. Moreover, the coloring also depends on whether the natural object is illuminated by reflected light as it would be at or adjacent to the point 16 in Fig. 1, or whether it is silhouetted against the source of light, as it would be at and adjacent to the point 17, or at any point on a cloudy day.

In order to determine how a natural object, such as a small fish, would appear when passing radially through the spectrum while illuminated by reflected light, a specimen of the small fish which it is desired to simulate is viewed through a prism 18, as shown in Fig. 3, while being illuminated by a source of light on the same side of the fish as is the prism, and while being held in a vertical position. If this is done the fish will appear to have a blue band across its upper end and a green band adjacent to the blue. Its lower end will appear to have a red band with a yellow band adjacent thereto. Consequently, a lure colored in this manner would closely simulate the appearance of a natural fish when passing radially through the spectrum and when illuminated by reflected light. Fig. 4 illustrates the apparent coloring of a fish which swims tangentially through the spectrum and it will be seen that the colors are arranged in the same manner with respect to the prism as they are in Fig. 3. However, inasmuch as the fish is in a horizontal position with respect to the prism the blue and green bands appear at the top of the fish while the yellow and red appear at the bottom.

Fig. 5 illustrates a lure colored so as to simulate as closely as possible the apparent coloring of the small fish under both the conditions illustrated in Figs. 3 and 4. Thus, the plug is provided with a red band along its lower side which extends along one end as well. Adjacent to this is a yellow band extending longitudinally of the lure and bounded on its lower side and one end by the red band. A blue band extends along the upper side of the lure and is continued so as to provide a blue end opposite to the red end. A green band is adjacent to the blue one and is continued so as to provide a green band adjacent to the blue end of the lure.

I have determined from experience that under conditions of bright sunlight a fish will not as a rule look directly at the sun, but is more apt to look at that portion of its window which is away from the sun. Consequently, under these conditions a fish is accustomed to see its food illuminated by reflected light and therefore is attracted by a lure colored in the manner illustrated in Fig. 5.

Fig. 6 illustrates an artificial fly colored in the same manner as the plug shown in Fig. 5. The proper coloring of this fly is determined in the manner illustrated in Figs. 3 and 4.

Under conditions of poor visibility where the light entering through the fish's window is diffused, any object which it sees through this window is silhouetted or in other words illuminated by transmitted light. Consequently, in order to determine the proper coloring for a lure to be used under these conditions, the object which it is desired to simulate is viewed through a prism while illuminated by a source of light on the opposite side of the object from the prism, as illustrated in Figs. 7 and 8. Fig. 7 illustrates the apparent coloring of a small fish while passing radially through the spectrum, while Fig. 8 illustrates its coloring while passing tangentially through the spectrum. If an object, such as the small fish, is viewed through a prism while illuminated by transmitted light, it will appear to have a color fringe at its upper and lower edges. The fringe at the top consists of a narrow band of yellow above a narrow band of red while the fringe at the bottom consists of a narrow band of green below a narrow band of blue. The central portion of the object is comparatively dark.

Fig. 9 illustrates a plug lure colored so as to simulate a small fish when seen under the conditions illustrated in both Figs. 7 and 8. Thus, the upper edge of the lure is provided with narrow bands of yellow and red which also extend along one end. The lower edge of the lure is provided with narrow bands of green and blue, which also extend along the opposite end of the lure. Obviously, an artificial fly may be colored in the same manner.

For the sake of simplicity it has been assumed in the above that the natural object which it is desired to simulate is itself a neutral color. However, if such object is brightly colored when illuminated by ordinary white light, best results are obtained by providing the lure with these same colors, but as modified by the spectrum. In other words, the proper coloring of the lure is determined by viewing the object which it is desired to simulate through a prism and coloring the lure in exactly the same manner as it appears through the prism. The lure will then include both the colors actually present on the natural object, as well as the colors imparted thereto by the spectrum.

The scope of my invention is not to be limited to the foregoing description, which has been given by way of example only, but is to be determined by the appended claims.

What is claimed is:

1. A fish lure having the predominant colors of the spectrum arranged thereon in the same manner as said colors appear on a natural object when viewed through a prism.

2. A fish lure having the predominant colors of the spectrum arranged thereon in the same manner as said colors appear on a natural object when viewed through a prism and illuminated by reflected light.

3. A fish lure having the predominant colors of the spectrum arranged thereon in the same manner as said colors appear on a natural object when viewed through a prism and silhouetted against a source of light.

PRESTON J. JENNINGS.